United States Patent [19]

Lee et al.

[11] Patent Number: 5,173,720
[45] Date of Patent: Dec. 22, 1992

[54] EYEWEAR FIELD-OF-VIEW CHANGER

[76] Inventors: Jin S. Lee, 440 Dixon Landing Rd. #A105, Milpitas, Calif. 95035; Thinh C. Nguyen, 3344 Landess Ave. #D, San Jose, Calif. 95132

[21] Appl. No.: 672,104

[22] Filed: Mar. 19, 1991

[51] Int. Cl.$^5$ .............................................. G02C 7/14
[52] U.S. Cl. ...................................... 351/50; 351/158
[58] Field of Search ................................. 351/50, 158

[56] References Cited

U.S. PATENT DOCUMENTS

| | | |
|---|---|---|
| 1,610,553 | 10/1924 | Jones . |
| 2,123,682 | 7/1938 | Wingate . |
| 2,358,348 | 9/1944 | Pierson et al. . |
| 3,019,689 | 2/1962 | Paulsrod . |
| 4,026,639 | 5/1977 | Lebo ..................................... 351/50 |
| 4,647,165 | 3/1987 | Lewis . |
| 4,704,014 | 11/1987 | Carner, Jr. . |
| 4,792,223 | 12/1988 | Axelbaum . |
| 4,804,261 | 2/1989 | Kirschen . |

Primary Examiner—Bruce Y. Arnold
Assistant Examiner—J. Ryan
Attorney, Agent, or Firm—Kolisch, Hartwell, Dickinson, McCormack & Heuser

[57] ABSTRACT

A specialty eyewear device including an optical frame that carries a pair of highly reflective surfaces that permit a wearer to experience an angular offset between the direct line of vision and the effective line of vision. No refraction occurs in the performance of the device, and no image reversal takes place. Modifications of the invention allow for certain angular adjustments in the device which can both change the actual angular offset which occurs between direct and effective line of vision, and permits angular rotation of a given angular offset.

10 Claims, 2 Drawing Sheets

EYEWEAR FIELD-OF-VIEW CHANGER

BACKGROUND AND SUMMARY OF THE INVENTION

This invention relates to specialty eyewear, and more particularly to eyewear capable of converting a user's direct line of vision into an angularly offset effective line of vision. We refer to this structure as an eyewear field-of-view changer.

There are many instances in which one might find it convenient to have eyewear capable of the kind of conversion referred to just above. For example, a person who enjoys watching television while lying in bed might appreciate the capability of lying down, in effect staring straight up as if toward the ceiling, and nevertheless comfortably viewing the image on the usual vertically disposed, horizontally displaced television screen. People likewise reclining on a beach might wish to be able to view surrounding scenery without sitting up. As another illustration, readers might enjoy the opportunity to read with a book placed below in the lap while apparently staring generally straight forward without having to bend the neck. Yet another application relates to computer use where one might wish to have a keyboard located adjacent the lap, with a monitor screen displaced laterally as in the case of television viewing mentioned above. Here, a user, while staring generally straight ahead could effectively be selectively viewing the keyboard, and, by lifting the line of vision slightly, selectively directly viewing the monitor screen.

Apparatus for converting one's line of vision generally has been proposed in the past, and a good illustration of prior art apparatus is found in U.S. Pat. No. 2,123,682 issued to Wingate. This patent discloses eyewear which includes a pair of laterally displaced triangular prisms each of which effects a change in apparent line of vision through the mechanisms of twin reflection and twin refraction. A Wingate type appliance, however, has a number of serious limitations. To begin with, the prismatic action which involves twin reflection and twin refraction offers some complications in what should otherwise be simple calculations to achieve a desired selected angular offset. In addition, prismatic structure is relatively cumbersome and heavy, as well as relatively expensive. Further, in an appliance such as that shown by Wingate, assuring proper bilateral alignment of two offset prisms is difficult to achieve, and hard to maintain under circumstances of transverse torsion being exerted upon the optical frame. Yet another drawback of prismatic construction is that it does not readily lend itself to offering a user an option of changing selectively the desired angular offset between the effective line of vision and the actual direct line of vision. Nor does it allow one to "rotate" the effective offset angle.

Proposed according to the present invention is a unique eyewear device which meets all of the convenience objectives set forth above while at the same time avoiding the drawbacks found in a prior art device like that proposed by Wingate.

According to a preferred embodiment of the invention, the proposed eyewear takes the form of a lightweight optical frame that carries of a pair of highly reflective planar optical surfaces which co-act to redirect, accurately and exactly the same for both eyes, a user's direct line of vision to a selected angularly offset effective line of vision. These reflective surfaces are also referred to herein as non-refractive, non-image-reversing, view-line-axis converting reflection means. The mechanism proposed herein, in a pair of disclosed modification, further includes adjustment mechanism which permits a user selectively to change the effective angular offset just mentioned, and/or, the angular "direction" of the offset angle (i.e., rotation).

These and other objects and advantages which are offered by the invention will become more fully apparent as the description that now follows is read in conjunction with the accompanying drawings.

DETAILED DESCRIPTION AND BEST MODE FOR CARRYING OUT THE INVENTION

Figure 1:
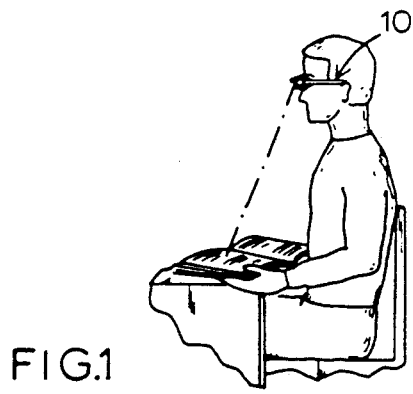
FIG. 1 is a simplified fragmentary side elevation illustrating apparatus constructed in accordance with the invention being worn by a user with the latter reading a book held just above the lap.
Figure 2:
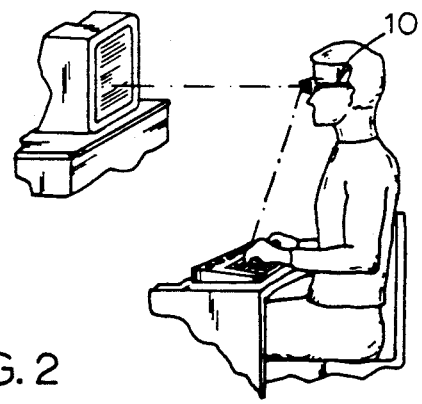
FIG. 2 is a view somewhat like that illustrated in FIG. 1 showing a user working with a computer system including a keyboard disposed just above the lap and a video monitor laterally and horizontally displaced in a normal position.
Figure 3:
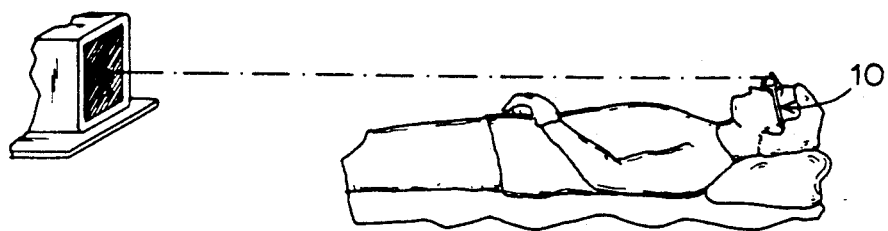
FIG. 3 illustrates eyewear constructed in accordance with the invention being employed by a user reclining on a bed, staring generally upwardly, and nevertheless viewing the action on a horizontally displaced television screen.

Turning now to the drawings, and referring first, briefly, to FIGS. 1, 2 and 3, as has been mentioned above in the description of these drawing figures, each illustrates a different use application of eyewear constructed in accordance with the present invention.

In FIG. 1, the proposed eyewear, shown generally at 10, permits a user, without bending his or her neck, to stare generally straight ahead while actually reading the text of a book held just above the lap. In FIG. 2, eyewear 10 permits the user to sit in an upright position and to view, through line-of-vision offset, a keyboard disposed just above the lap, and by a slight shift of the direct line of vision, which will be more fully discussed later, to view the normally laterally displaced screen of a video monitor. FIG. 3 shows eyewear 10 permitting a reclining user to stare essentially straight up, while at the same time viewing something laterally displaced, such as the television screen illustrated at the left side of the figure. This kind of use orientation would also characterize outdoor use such as the beach use mentioned earlier.

Figure 4:
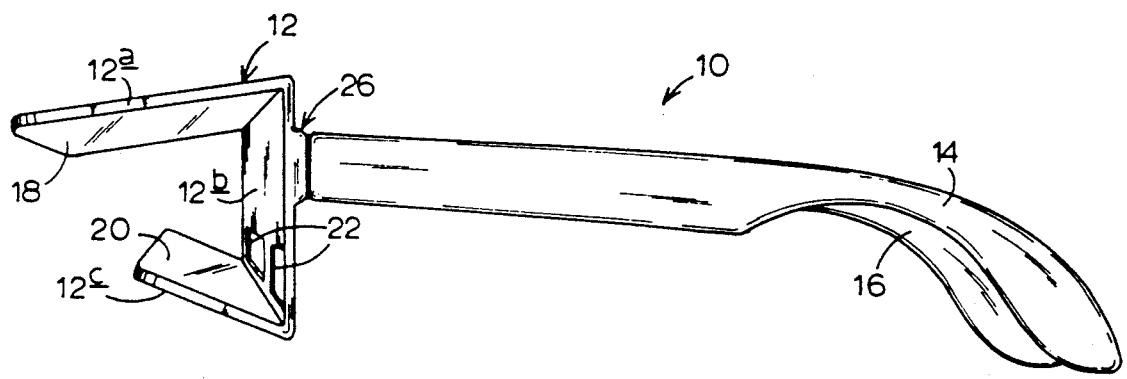
FIG. 4 is an enlarged side view illustrating a preferred embodiment of the eyewear depicted in use in the first three drawing figures.
Figure 5:
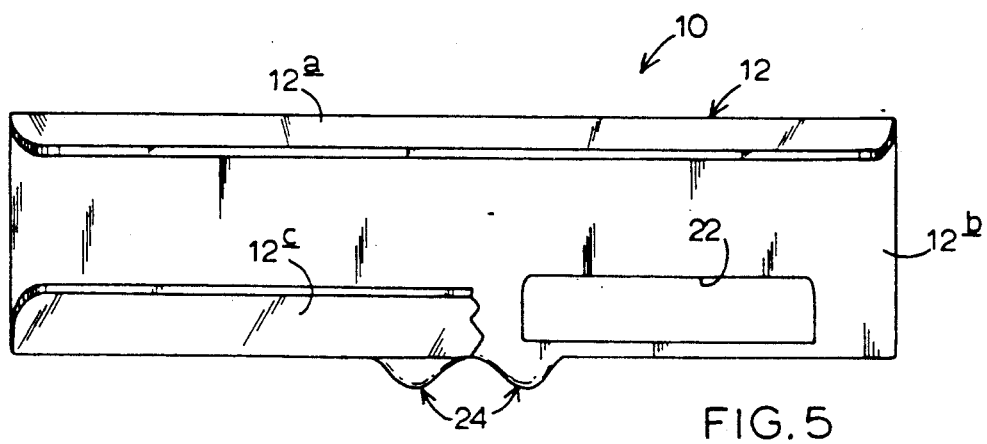
FIG. 5 is a view taken generally from the left side of FIG. 4, with a portion broken away to illustrate details of construction.

FIGS. 4 and 5 illustrate a preferred embodiment of eyewear 10, which herein includes a unitary optical frame 12, and a pair of conventional laterally displaced temples 14, 16 (shown only in FIG. 4).

Frame 12, in the embodiment now being described, is a unitary structure molded, for example, from acrylic to include three substantially planar panels shown at 12a, 12b, 12c. While different specific relative angular dispositions may be chosen to suit different applications (in the case of a rigid and unitary optical frame), panel 12a joins panel 12b with an angular disposition of about 85-degrees, and panel 12b joins panel 12c with an angular disposition of about 65-degrees. The overall length of frame 12 (the dimension extending into the plane of FIG. 4) herein is about 5½-inches. This length is one which assures spanning of the distance between the normal individual-eye lines of vision of a user. Panel 12a has a width of about 2-inches, panel 12b a height of about 1½-inches, and panel 12c a width of about 1-inch. Each panel has substantially the same thickness herein of about ⅛-inches.

The underside of panel 12a in FIGS. 4 and 5 is coated with a highly reflective material, such as vacuum-deposited aluminum, to have a highly reflective surface 18. Similarly, the upper surface 20 of panel 12c is likewise provided with a highly reflective surface. Each of these two reflective surfaces, preferably, is protected through a thin coating of deposited silicon dioxide which acts as a scratch protectant.

Formed in panel 12b, just above the region of joinder between this panel and panel 12c, are two laterally offset windows 22. Each of these windows has a length herein of about 1⅛-inches, a height of about ⅜-inches, and the two windows are separated by about ¾-inches.

Completing a description of frame 12, and focusing attention on FIG. 5, formed centrally on the underside of the frame in the region where panels 12b, 12c join is nosebridge structure shown generally at 24.

Previously mentioned temples 14, 16 are joined through conventional hinge mechanisms, such as that shown for temple 14 in FIG. 4 at 26, to opposite ends of the rear side of panel 12b.

Figure 6:
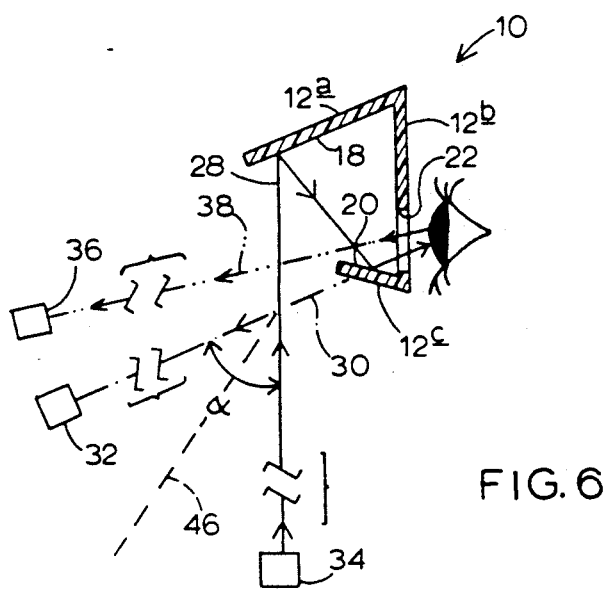
FIG. 6, which is on a smaller scale than FIGS. 4 and 5, illustrates optical performance offered by the eyewear of FIGS. 4 and 5.

Looking now at FIG. 6, here the optical performance of the structure described so far is illustrated. We should mention at this point that FIG. 6 is employed herein to illustrate how eyewear 10 operates both for applications such as those shown in FIGS. 1 and 3, and for the somewhat different application shown in FIG. 2.

In the applications illustrated in FIGS. 1 and 3, the eyewear is employed solely for the purpose of shifting a direct line of vision to an angularly offset effective line of vision. In this application, the viewer's effective optical view path is as depicted by the several segments of solid line 28 in FIG. 6. The short fragment of this line which extends directly between the eyeball and reflective surface 20 extends along what is referred to herein as the user's direct line of vision. This direct line of vision is extended in FIG. 6 by dash-dot line 30 toward a virtual image of the real object being viewed, which virtual image is depicted schematically at 32 in FIG. 6. The real object being viewed in FIG. 6 is shown schematically at 34, and the segment of line 28 which extends upwardly from this object is what is referred to herein as the angularly offset effective line vision. The angle between the angularly offset effective line of vision and the direct line of vision, shown at $\alpha$ in FIG. 6 herein, is about 70-degrees.

In the type of application illustrated in FIG. 2, when the user wishes to view the keyboard shown in this figure, he or she uses eyewear 10 in the manner which has just above been described. When he or she, however, wishes to view the screen of the associated video monitor, shown schematically at 36 in FIG. 6, he or she simply lifts the direct line of vision to the dash-double-dot line shown at 38 in FIG. 6, which line permits direct viewing through windows 22, above the forward edge of panel 12c, and toward the monitor.

The interesting utility and varied applicability of eyewear 10 as described so far should now be readily apparent. The eyewear effectively permits conversion of a user's direct line of view to an angularly offset line of view. No complicating refraction is involved, and no image reversal occurs. The structure of the eyewear is such that it is extremely lightweight, and therefore comfortable to wear and use, while at the same time having substantial rigidity in the optical frame to maintain the proper positional relationship between reflective surfaces 18, 20. In other words, frame 20 significantly resists longitudinal twisting which could cause disconcerting misalignment between the offset lines of view afforded for the two eyes.

Figure 7:
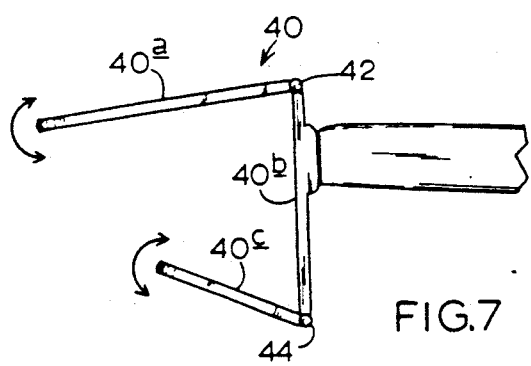
FIG. 7, which is on about the same scale as FIG. 4, illustrates a fragmentary side view of a modified form of eyewear in which two panels therein which carry reflective surfaces are each hinged in the structure for independent angular adjustment, thus to permit both a change in the effective offset between a direct and an effective line of vision, as well as to permit adjustment of what might be thought of as the angular disposition of a given, selected angular offset.

Looking now at FIG. 7, here there is shown an optical frame 40 having three planar panels 40a, 40b, 40c. Panel 40a joins panel 40b through an adjustable hinge mechanism (adjustment means) 42 and panel 40b joins panel 40c through a similar hinge mechanism 44. Preferably these two hinge mechanisms, which may take one of a variety of conventional forms, are releasably locking or frictioning hinging mechanisms which, while permitting selective adjustment, also tend to stabilize and maintain a particular adjustment once the same has been made. These hinge mechanisms provide hinge axes which are substantially normal to the plane of FIG. 7.

The panels making up frame 40 are preferably molded of acrylic, with the surfaces of panels 40a, 40b corresponding to surfaces 18, 20 on previously mentioned panels 12a, 12c similarly reflective formed. Windows, like previously mentioned windows 22, are provided in panel 40b, and temples, like temples 14, 16, are joined adjacent the back side and on opposite ends of panel 40b.

By adjusting one or both of the angular dispositions of panels 40a, 40c relative to one another and to panel 40b, two different kinds of things can be accomplished. First, a user can selectively change the offset angle, referred to as angle $\alpha$ above, between the user's direct line of vision and the angularly offset effective line of vision. Second, whether or not such a change is made in the offset referred to, the entire angular disposition of the offset can be tilted up or down (rotated). A way of viewing this, and considering once again FIG. 6, is that dashed line 46, which is a line that bisects angle $\alpha$, can be rotated without any change occuring in the value of angle $\alpha$.

Figure 8:
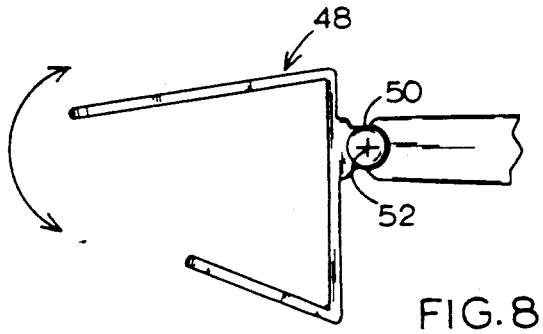
FIG. 8 is similar to FIG. 7, and illustrates another embodiment including an adjustment mechanism which permits solely angular adjustment of the angular disposition of the angle of offset.

FIG. 8 illustrates at 48 an optical frame which is substantially the same in construction as previously described frame 12. However, in the eyewear illustrated in FIG. 8, frame 48 is joined to the temples through a pair of laterally offset hinge mechanisms, such as mechanism 50, which permit angular adjustment of the frame as a unit about an axis through these mechanisms shown generally at 52. Axis 52 is substantially normal to the plane of FIG. 8. Preferably, mechanisms 50 have the release/lock, or frictioning, characteristics mentioned earlier with respect to hinge mechanisms 42, 44.

The embodiment shown in FIG. 8 thus permits, without any change occuring in previously mentioned angle $\alpha$, rotation of the effective angular orientation of this offset.

In FIGS. 7 and 8, nosebridge structure has been omitted for the sake of drawing simplicity.

Figure 9:
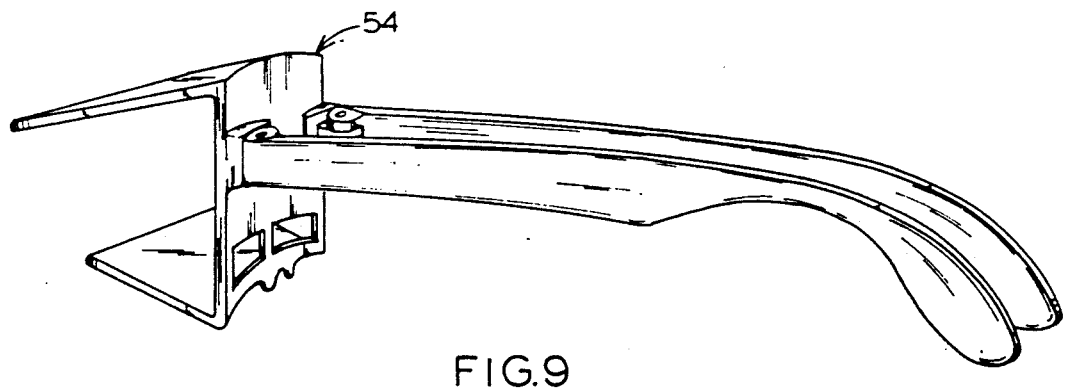
FIG. 9 is somewhat similar to FIG. 4, and illustrates a structure wherein the portion of the eyewear structured to extend across the face of a user is curved generally to match contour.

FIG. 9 illustrates a structure which, but for a single change, is substantially identical in construction to the structure shown in FIGS. 4 and 5. Here, there is an optical frame 54 which is molded, with its upright panel, corresponding to previously mentioned panel 12b, curved as illustrated generally to conform to the curvature of the front of a user's face.

Figure 10:
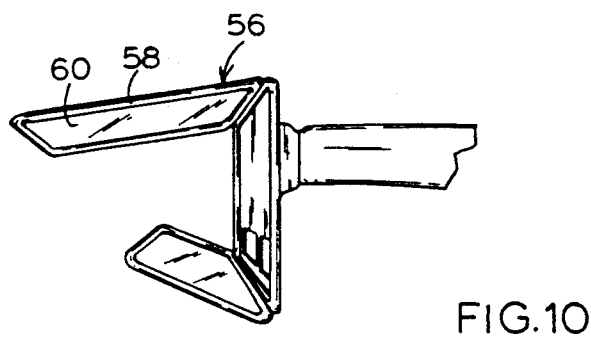
FIG. 10, which is similar in point of view to the views shown in FIGS. 7 and 8, illustrates yet another embodiment in which a rod-like optical framework is employed with snap-in panels.

FIG. 10 illustrates eyewear with an optical frame 56 that is formed with its three panels each defined by what might be thought of as a rod-like perimeter structure, such as that shown generally at 58, which receives, by pop-in fitting, appropriately matched panel elements, such as the element shown generally at 60. The "rod-like" structure is preferably formed of a suitable molded plastic material.

An advantage offered by the construction of FIG. 10 is extreme lightweightness.

Figure 11:
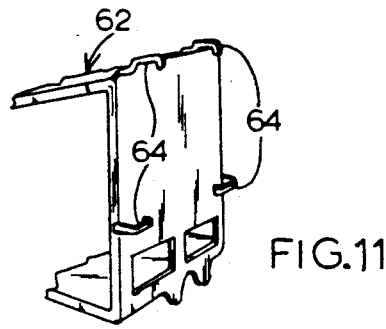
FIG. 11 is a view which illustrates still another modification of the invention that offers the possibility of snap-fitting onto other eyewear which might normally be worn by a user.

FIG. 11 illustrates at 62 a molded optical frame which is very much like previously mentioned frame 12, except that it is not intended to be joined to temples. Rather, frame 22 is equipped with sets of clips, such as those sets shown at 64 which enable the entire frame to be clipped removably onto the frame of the user's own eyewear.

It should now be completely apparent how the eyewear proposed, in its several embodiments, herein by the present invention offers all the advantages spoken of earlier in the description, and avoids the mentioned serious disadvantages of known prior art structure.

The eyewear may conveniently be offered in different sizes to suit different people. If desired, selected light-filtering layers may be added to minimize glare and to offer a "sunglasses" effect. Also, color tinting is possible.

While a preferred embodiment has been described herein, and certain modifications illustrated and suggested, other variations and changes may be made without departing from the spirit of the invention.

It is claimed and desired to secure by Letters Patent:

1. Eyewear for converting a user's direct line of vision into an angularly offset effective line of vision comprising
   a user-wearable frame, and
   highly reflective, non-image-reversing, view-line-axis-converting reflection means mounted on said frame, operable, with the eyewear worn by a user, to convert the user's direct line of vision into a selected, angularly offset effective line of vision when the viewer is staring away from a generally straight ahead direction, while permitting the user's unobstructed generally straight ahead view.

2. The eyewear of claim 1, wherein said reflection means comprises means forming a pair of angularly offset, angularly facially confronting reflective surfaces.

3. The eyewear of claim 2, wherein each of said surfaces, is elongate, is rigidified in a plane to resist longitudinal twisting, and is designed to span a distance encompassing the individual lines of vision of both eyes of a user.

4. The eyewear of claims 1, 2 or 3, which further includes adjustment means permitting selective adjustment of the angular performance offered by the eyewear.

5. The eyewear of claim 1, wherein said converting means is effective when the user's direct line of vision is shifted downward from the generally straight ahead direction.

6. Eyewear for converting a user's direct line of vision into an angularly offset effective line of vision comprising:
   a frame including a front panel with at least one viewing window and means for positioning the window in front of the user's eye; and
   top and bottom panels each having a highly reflective inner side connected to and forming an acute angle with the front panel, the top and bottom panels being sufficiently separated to allow the user an unobstructed generally straight ahead line of vision through the window.

7. The eyewear of claim 6, wherein said top panel extends further from the front panel than the bottom panel so that an image which is below the user's generally straight ahead line of vision may be reflected from the top panel to the bottom panel before passing through the window to the user's eye.

8. The eyewear of claim 6, wherein said front panel has two windows each being positionable in front of one of the user's eyes.

9. The eyewear of claim 6, wherein the angle between said front panel and said top panel is approximately 85-degrees and the angle between said front panel and said bottom panel is approximately 65-degrees.

10. The eyewear of claim 6, wherein said means for positioning the front panel includes two temples, each temple extendable in a generally perpendicular direction from the front panel to one of the user's ears.

* * * * *